(12) United States Patent
Kim

(10) Patent No.: US 7,096,994 B2
(45) Date of Patent: Aug. 29, 2006

(54) METHOD OF CONTROLLING RECOVERY IN ELECTRIC POWER STEERING SYSTEM

(75) Inventor: Seong-Joo Kim, Sungnam-si (KR)

(73) Assignee: Mando Corporation, (KR)

( * ) Notice: Subject to any disclaimer, the term of this patent is extended or adjusted under 35 U.S.C. 154(b) by 197 days.

(21) Appl. No.: 10/946,911

(22) Filed: Sep. 22, 2004

(65) Prior Publication Data

US 2006/0060411 A1   Mar. 23, 2006

(51) Int. Cl.
*B62D 5/04* (2006.01)
(52) U.S. Cl. .................. 180/446; 180/444; 701/41; 701/42
(58) Field of Classification Search ............. 180/443, 180/444, 446; 701/41–43
See application file for complete search history.

(56) References Cited

U.S. PATENT DOCUMENTS

| 5,881,836 | A | * | 3/1999 | Nishimoto et al. ......... 180/446 |
| 6,041,887 | A | * | 3/2000 | Kojo et al. ................. 180/446 |
| 6,360,151 | B1 | * | 3/2002 | Suzuki et al. ................ 701/41 |
| 6,729,435 | B1 | * | 5/2004 | Yamada et al. ............ 180/446 |
| 6,856,869 | B1 | * | 2/2005 | Takahashi .................... 701/41 |

2002/0060538 A1   5/2002 Hara et al.

FOREIGN PATENT DOCUMENTS

| DE | 3923654 A1 | 2/1990 |
| EP | 1 300 321 A1 | 9/2003 |

* cited by examiner

*Primary Examiner*—Lesley D. Morris
*Assistant Examiner*—L. Lum
(74) *Attorney, Agent, or Firm*—R. Neil Sudol; Henry D. Coleman; William J. Sapone

(57) ABSTRACT

The present invention relates to a method of controlling recovery in an electric power steering system which can enhance the recovery control function during recovery after steering when discriminating a recovery state using a steering angle and a steering angular velocity by determining whether or not the steering angular velocity is more than a predetermined value and carrying out recovery control only in the corresponding recovery state.

The method of controlling recovery of the present invention comprises a first step of setting a recovery gain and a recovery pattern; a second step of obtaining a recovery current; a third step of determining whether the steering angular velocity is more than a predetermined value; and a fourth step of obtaining a motor driving current and performing the recovery control function by controlling the operation of the motor according to the obtained motor driving current.

1 Claim, 3 Drawing Sheets

METHOD OF CONTROLLING RECOVERY IN ELECTRIC POWER STEERING SYSTEM

BACKGROUND OF THE INVENTION

1. Field of the Invention

The present invention relates to a method of controlling recovery in an electric power steering system, and more particularly, to a method of controlling recovery in an electric power steering system which can enhance the recovery control function during recovery after steering when discriminating a recovery state using a steering angle and a steering angular velocity by determining whether or not the steering angular velocity is more than a predetermined value and carrying out recovery control only in the corresponding recovery state.

2. Description of the Related Art

Generally, a vehicle is provided with an electronic control unit (hereinafter, 'ECU') for a vehicle that receives an input of an electric signal detected from various kinds of input sensors and outputs a digital control signal which operates various kinds of actuators at the output side.

Meanwhile, there has been developed an EPS system that enables a light and quick steering operation by reducing the actuating force of a driver's steering wheel according to the speed of a vehicle using such an ECU. As shown in FIG. 1, this EPS system includes a sensor unit 1 such as a speed sensor detecting a vehicle speed, a motor position sensor (or a steering angle sensor in case of a vehicle having a steering angle sensor) detecting the relative steering angle of a motor, a torque sensor detecting the torque of a driver steering wheel, etc., an ECU 2 receiving an input of a signal detected from the sensor unit 1 and outputting various kinds of motor control signals and operation signals for reducing the actuating force of the driver's steering wheel and a motor controlling and driving unit 3 controlling the operation of the motor according to the motor control signals and operation signals from the ECU 2 and operating a steering mechanism by a steering assistance force which is caused by a generating power according to driving of the motor.

The thusly constructed EPS system further includes an appliance unit such as a motor or reduction gear in addition to a general hydraulic power steering system, and thus is increased in friction. Accordingly, the characteristics like the degradation of friction feel or stability during steering are shown.

Therefore, a graph of the relation of a steering torque with respect to a steering input angle will be shown, in which the hysteresis becomes more than those of other hydraulic power steering vehicles. In the prior art, a recovery control function was used to compensate for the demerit.

Especially, a recovery control is carried out while seeing a return speed or retention angle of a steering wheel being not held after steering. That is, if a driver let go of the steering wheel, an assist current by which the steering wheel faces to a neutral position is generated using an absolute steering angle signal, thereby making the steering wheel easily returned after steering.

However, in the prior art recovery control method, a recovery state is discriminated by judging that the driver lets go of the steering wheel if the signal of the torque sensor is smaller than a predetermined value. Thus, if the driver slowly releases the steering wheel without completely letting go of the steering wheel, there occurs a problem that a complete recovery control is not applied since a small quantity of a torque exists in the steering wheel.

In other words, as shown in FIG. 2, a recovery gain for a vehicle speed is set (S1), a recovery pattern for a steering angle is set (S2) and then a recovery current is obtained by multiplying the recovery gain and the recovery pattern (S3).

Afterwards, it is determined whether a steering torque is within Deadzone (Deadzone is a range which a torque can not be felt in) (S4).

As the result of the determining of the steps S4, in a case that, the steering wheel is not positioned in a straight traveling state and the steering torque is within Deadzone because of driver's letting go of the steering wheel, an assist current and the recovery current obtained in the step S3 are summed to obtain a motor driving current (S5). The assist current is calculated with the torque sensor signal and the information of the vehicle speed. Finally, the recovery control function is carried out by controlling the operation of the motor according to the motor driving current obtained in the step S5.

However, also in the above-described recovery control method, a recovery state is discriminated based on the steering torque as in the steps S4, and then recovery control is carried out. Subsequently, in case that the driver operates the steering wheel a little in left and right direction during turning of the vehicle, a frequent alternation between a recovery state and a steering state is instantly occurred. Due to this, a discontinuous motor driving current is generated by a recovery control logic, thereby arousing a problem that the driver feels the steering feeling roughly.

SUMMARY OF THE INVENTION

The present invention is designed in consideration of the problems of the prior art, and therefore it is an object of the present invention to provide a method of controlling recovery in an EPS system which can acquire an enhanced recovery control function with a smoother steering feeling during recovery after steering when discriminating a recovery state using a steering angle and a steering angular velocity by discriminating a recovery state under the condition that a steering angular velocity is more than a predetermined value and carrying out recovery control not in a case that the steering angular velocity is in an alternation state, which occurs when a steering wheel is held, but in a case the recovery speed of the steering wheel is more than a predetermined value.

To achieve the above object, there is provided a method of controlling recovery in an electric power steering system in accordance with the present invention, comprising: a first step of setting a recovery gain for a vehicle speed in an ECU of the EPS system and setting a recovery pattern for a steering angle; a second step of obtaining a recovery current by multiplying the recovery gain and the recovery pattern set in the first step; a third step of determining whether a steering angular velocity is more than a lower limit set value of counterclockwise(CCW) direction at a steering position of a vehicle turning right or the steering angular velocity is more than a lower limit set value of clockwise(CW) direction at a steering position of the vehicle turning left; and a fourth step of obtaining a motor driving current by summing an assist current and the recovery current obtained in the second step if the steering angular velocity is more than the lower limit set value of counterclockwise direction at the steering position of the vehicle turning right or the steering angular velocity is more than the lower limit set value of clockwise direction at the steering position of the vehicle turning left as the result of the determining in the third step and performing the recovery control function by controlling the operation of the motor according to the obtained motor driving current.

BRIEF DESCRIPTION OF THE DRAWINGS

Other objects and aspects of the present invention will become apparent from the following description of embodiments with reference to the accompanying drawings in which.

DESCRIPTION OF THE PREFERRED EMBODIMENT

Hereinafter, a method of controlling recovery in an EPS system of the present invention will be described in more detail referring to the accompanying drawings.

Figure 1:
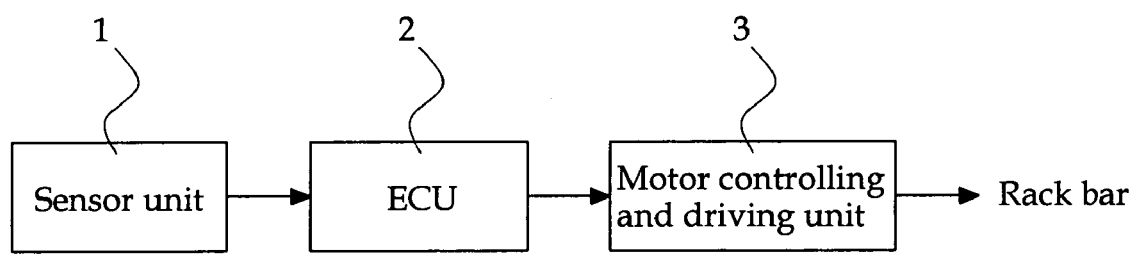
FIG. 1 is a schematic block diagram of a conventional EPS system.
Figure 2:
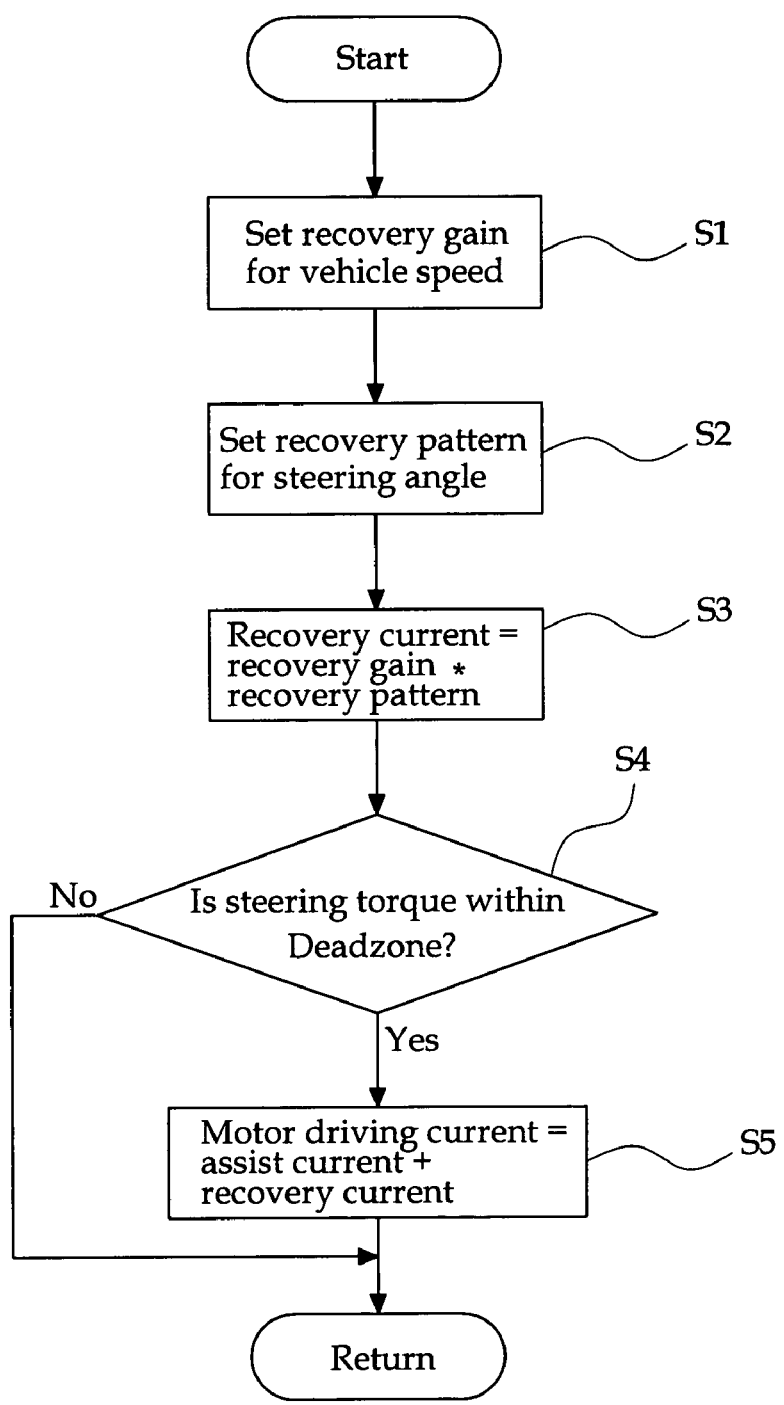
FIG. 2 is a flow chart showing a prior art method of controlling recovery in an EPS system.

As shown in FIG. 1, the EPS system includes a sensor unit 1 having a vehicle speed sensor, a motor position sensor, a torque sensor, etc., an ECU 2 and a motor controlling and driving unit 3.

Figure 3:
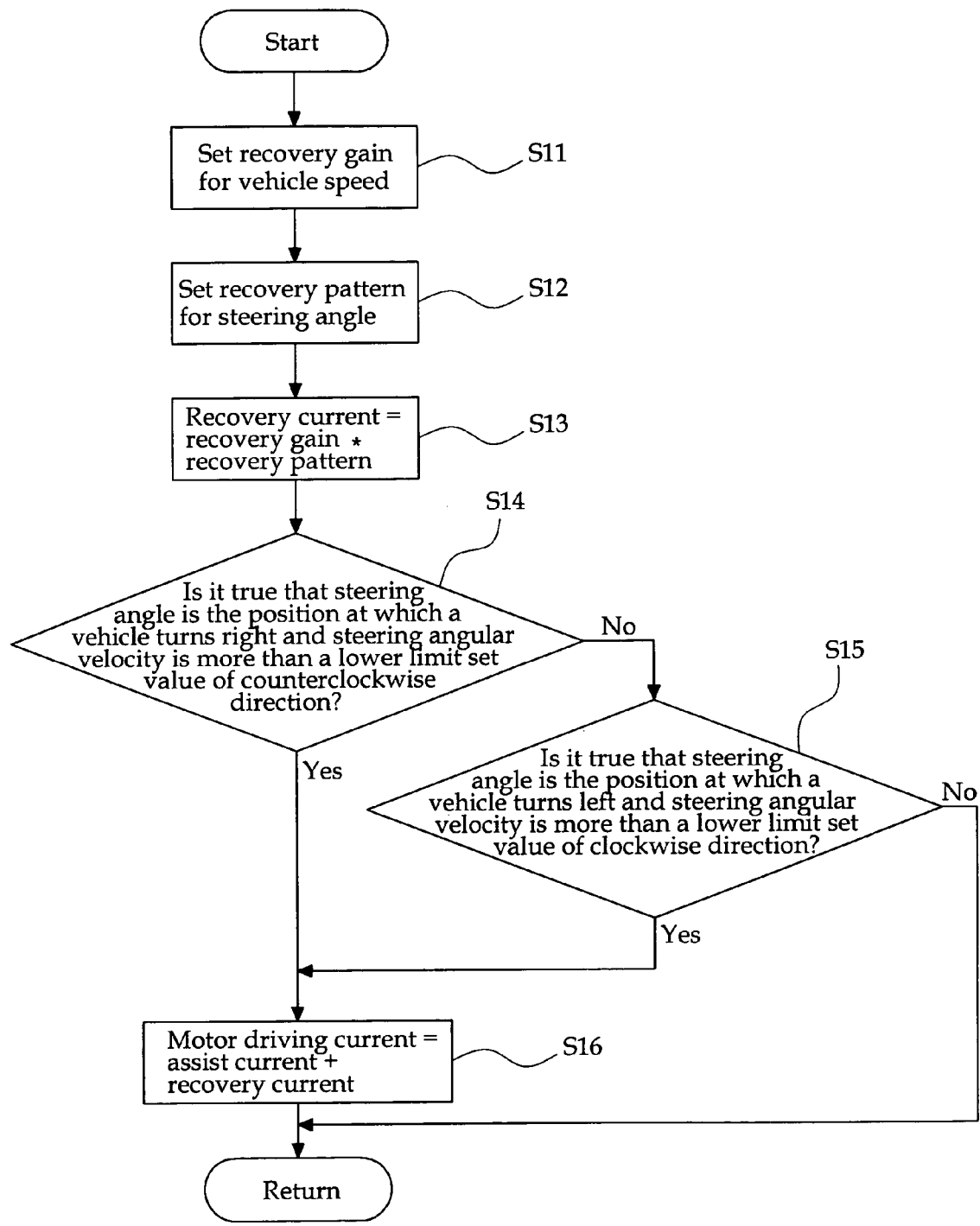
FIG. 3 is a flow chart showing a method of controlling recovery in an EPS system in accordance with the present invention.

The method of controlling recovery in accordance with the present invention that is carried out in the thusly constructed EPS system will be described with reference to FIG. 3 as follows.

First, the ECU 2 of the EPS system sets a recovery gain for a vehicle speed detected through the vehicle speed sensor in the sensor unit 1 (S11), and a recovery pattern for a steering angle detected through the motor position sensor in the sensor unit 1 is set (S12).

Continuously, the recovery gain set in the step S11 and the recovery pattern set in the step S12 are multiplied to obtain a recovery current (S13).

Then, it is determined whether or not the steering angle, i.e., the steering position detected through the motor position sensor (or a steering angle sensor) in the sensor unit 1 is the position at which the vehicle turns right and the steering angular velocity is more than a lower limit set value of counterclockwise(−) direction (S14). As a result of the determining, if it is not the case that the steering position is the position at which the vehicle turns right and the steering angular velocity is more than a lower limit set value of counterclockwise(−) direction, then it is determined whether or not the steering position detected through the motor position sensor in the sensor unit 1 is the position at which the vehicle turns left and the steering angular velocity is more than a lower limit set value of clockwise(+) direction (S15).

In other words, it is determined whether the steering angular velocity is more than a reference steering angular velocity by comparing the steering angular velocity with the absolute values for the lower limit set value of the counterclockwise(−) direction revolution speed and lower limit set value of the clockwise(+) direction revolution speed. This is for carrying out recovery control only when the recovery speed of the steering wheel is more than a predetermined value.

Afterwards, as the result of the steps S14 and S15, if the steering position is the position at which the vehicle turns right and the steering angular velocity is more than a lower limit set value of counterclockwise direction or the steering position is the position at which the vehicle turns left and the steering angular velocity is more than a lower limit set value of clockwise direction, the ECU 2 obtains a motor driving current by summing the assist current and the recovery current obtained in the step S13 (S16). Finally, the recovery control function is carried out by controlling the operation of the motor according to the motor driving current obtained in the step S16.

As seen from above, in the present invention, the steering feeling which the driver feels can be enhanced by carrying out recovery control in a manner to use a steering angle and a steering angular velocity as the condition of applying recovery control and determining a recovery state if the steering angular velocity is more than a predetermined value in a subdivided condition.

As mentioned above, the present invention can acquire an enhanced recovery control function with a smoother steering feeling during recovery after steering when discriminating a recovery state using a steering angle and a steering angular velocity by discriminating a recovery state under the condition that a steering angular velocity is more than a predetermined value and carrying out recovery control not in a case that the steering angular velocity is in an alternation state, which occurs when a steering wheel is held, but in a case the recovery speed of the steering wheel is more than a predetermined value.

In other words, only when the recovery speed of the steering wheel is more than a predetermined value, the recovery control is carried out. Thus, in case of turning and retaining a steering angle, the driver can have an improved steering feeling.

What is claimed is:

1. A method of controlling recovery in an electric power steering system, comprising:
   a first step of setting a recovery gain for a vehicle speed in an ECU of the EPS system and setting a recovery pattern for a steering angle;
   a second step of obtaining a recovery current by multiplying the recovery gain set in the first step and the recovery pattern set in the first step;
   a third step of determining whether the steering angle is a steering position at which a vehicle turns right and the steering angular velocity is more than a lower limit set value of counterclockwise direction or the steering angle is a steering position at which the vehicle turns left and the steering angular velocity is more than a lower limit set value of clockwise direction after performing the second step; and
   a fourth step of obtaining a motor driving current by summing an assist current and the recovery current obtained in the second step if the steering angular velocity is more than the lower limit set value of counterclockwise direction at the steering position of the vehicle turning right or the steering angular velocity is more than the lower limit set value of clockwise direction at the steering position of the vehicle turning left as the result of the determining in the third step and performing a recovery control function by controlling the operation of the motor according to the obtained motor driving current.

* * * * *